(No Model.)
T. A. EDISON.
Magnetic Ore-Separator.
No. 228,329.        Patented June 1, 1880.
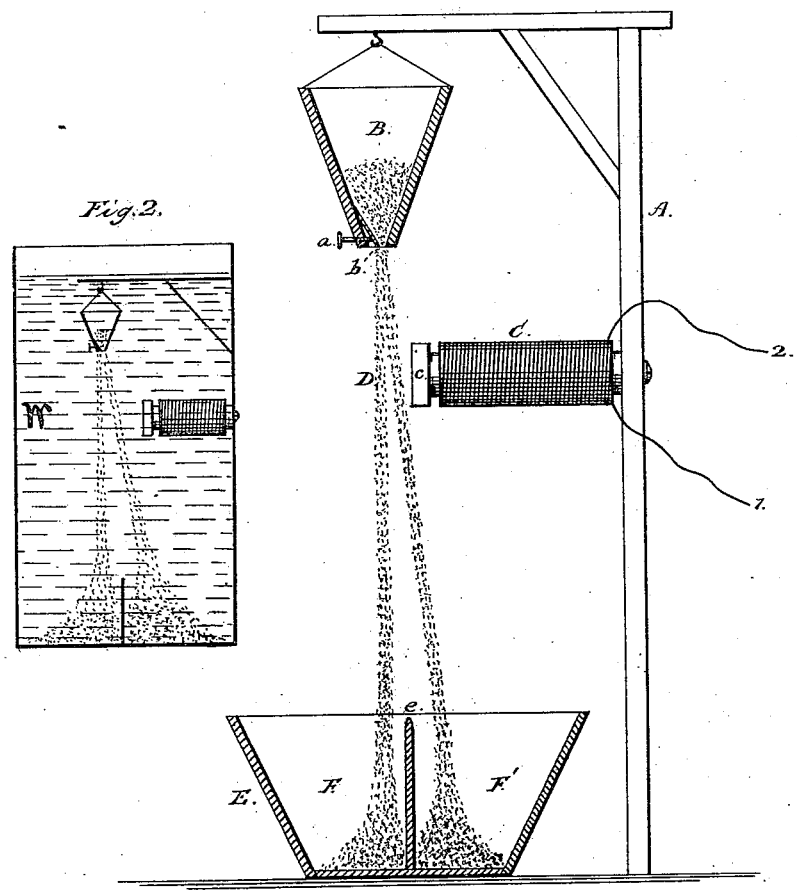
Attest:
F. W. Howard
F. C. Neall
Inventor:
Thomas A. Edison
by Dyer & Wilber
Attys

UNITED STATES PATENT OFFICE.

THOMAS A. EDISON, OF MENLO PARK, NEW JERSEY.

MAGNETIC ORE-SEPARATOR.

SPECIFICATION forming part of Letters Patent No. 228,329, dated June 1, 1880.

Application filed April 7, 1880. (No model.)

*To all whom it may concern:*

Be it known that I, THOMAS A. EDISON, of Menlo Park, in the county of Middlesex and State of New Jersey, have invented a new and useful Improvement in the Magnetic Separation of Substances; and I do hereby declare that the following is a full and exact description of the same, reference being had to the accompanying drawings, and to the letters of reference marked thereon.

The object of this invention is to furnish means which, while simple and cheap in construction, shall economically and effectually separate magnetic from non - magnetic substances. To this end I so arrange a hopper for feeding the mingled magnetic and nonmagnetic substances, a magnet, and receptacle for the substances, in such relation to each other that the trajectory of falling magnetic substances is altered, the magnetic and nonmagnetic substances falling into different receptacles.

A suitable method of carrying this invention into effect is as follows: A hopper, preferably provided with an adjustable valve-orifice, and arranged to feed the mingled substances in a thin broad stream, is supported in any suitable way several feet (more or less) above a bin, which is partly immediately under the feeding-orifice of the hopper, so that material falling from the hopper would, under normal conditions, fall therein. Between the hopper and the bin, and to one side of the straight line connecting the two, is a magnet having a polar extension whose face is of a length equal to the width of the feeding-orifice of the hopper. Underneath the magnet, and by the side of the bin before mentioned, is another bin for the reception of the magnetic substances. Instead of these two bins, one bin, with a partition nearly or quite underneath the pole of the magnet, may be used, or a simple partition may be similarly placed upon a floor and the bin or bins entirely dispensed with.

The material fed from the hopper tends to fall in a straight line. As it comes, however, within the influence of the magnet the magnetic portions are attracted thereby and move toward the magnet, which is so placed with relation to the falling material that it cannot be attracted entirely to the magnet before gravity has carried it past. In other words, the trajectory of the falling magnetic substance is altered, it moving for a portion of its fall in a line which is the resultant of the two forces—gravity and magnetism—acting upon it.

In the drawings, Figure 1 represents, partly in elevation, partly in section, a simple apparatus for carrying my invention into effect. Fig. 2 shows the apparatus submerged in water.

To any suitable support or frame-work A is attached a hopper, B, provided with a flap-valve, *b*, adjusted by screw *a*, for regulating the thickness of the sheet of issuing material. A magnet, C, is supported below the hopper B in any suitable way. This magnet is provided with an extended polar face, *c*, of a length equal to the width of the feeding-orifice of the hopper. The polar face *c* is to one side of the line which the material would assume by force of gravity in falling from the hopper. This magnet C is connected by wires 1 2 to a battery, generator, or any suitable source of electricity.

Beneath the hopper and magnet is placed a bin or receptacle, E, having a partition, *e*, dividing it into two parts, the bin being so placed that the partition is nearly beneath the pole *c*—that is, so placed that if continued upwardly it would pass between the pole and the feeding-orifice of the hopper. Instead of a bin or bins being used, this partition *e* may be placed directly upon the floor.

Supposing now the hopper B to be filled with material, partly magnetic, partly non-magnetic, the material in falling would by force of gravity fall as shown at F. The magnetic portions, however, are attracted toward the magnet C; but before they are brought over out of their path sufficiently to touch and cling to the pole *c* gravity has carried them past, and they fall as shown at F'.

Instead of a magnet or magnets on one side, a magnet or magnets on both sides of the falling stream of material may be used, in which case the non-magnetic particles would fall in the center, the magnetic particles being drawn to one side or the other.

Instead of electro - magnets, it is evident that, if desired, permanent magnets may be used.

When the material is wet it may first be dried; or the entire apparatus may be placed in a tank of water, as I have found that when wet, heavy sand is used the tendency to clog in the hopper and to cling together in falling is entirely overcome by placing the hopper and magnet in water, as shown in Fig. 2; or the hopper alone may be placed in a tank of water and the magnet entirely upon the outside thereof, or the body upon the outside, with its polar face extending through the side of the tank.

While the drawings show the substance falling in a straight line, it is evident that the principle of this invention could be carried into effect in other ways. For instance, the material to be treated may be first impelled by a blast of air or by other means in a horizontal plane, and the magnet placed above or below the line of the normal trajectory of the material, so as to lengthen or shorten the trajectory of the magnetic substance.

When desired the material to be acted on may be fed through the magnetic field in a column of water, the water acting to keep the particles apart, preventing them clinging together by capillarity. The magnet in such case draws the magnetic particles out of the column of water, or out of the center thereof, which may be pumped back and used over and over.

What I claim is—

1. The method of separating magnetic and non-magnetic substances, which consists in allowing them to fall together, and then by magnetic attraction altering or changing the trajectory of the falling magnetic substance without stopping its fall, substantially as set forth.

2. The combination of a hopper, a magnet, and a dividing partition, when arranged relatively to each other, as hereinbefore set forth.

3. The combination of a hopper and a magnet, arranged relatively to each other, as hereinbefore described, and submerged in water, substantially as set forth.

This specification signed and witnessed this 3d day of April, 1880.

THOMAS A. EDISON.

Witnesses:
WM. CARMAN,
GEO. E. CARMAN.